United States Patent Office 2,796,722
Patented June 25, 1957

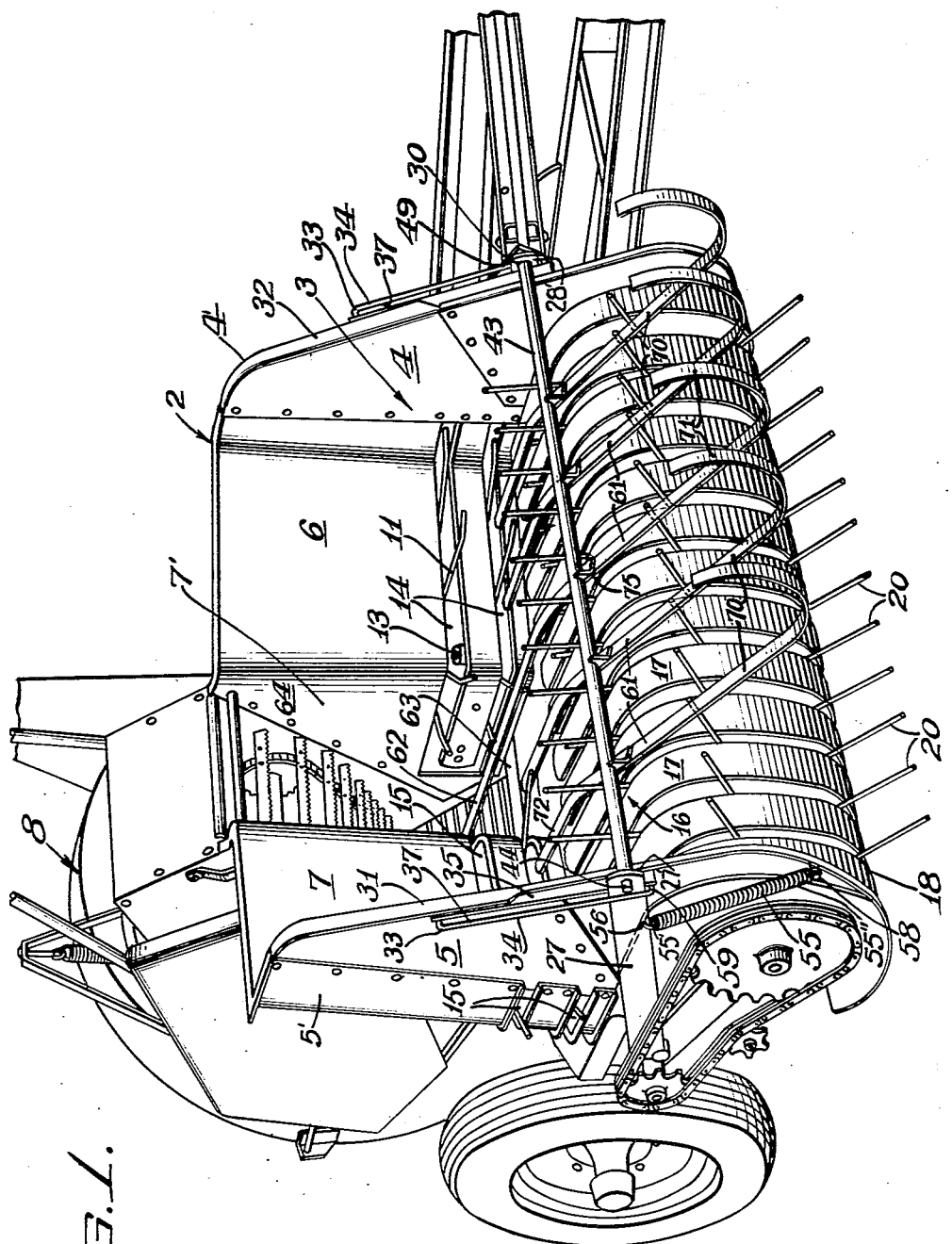

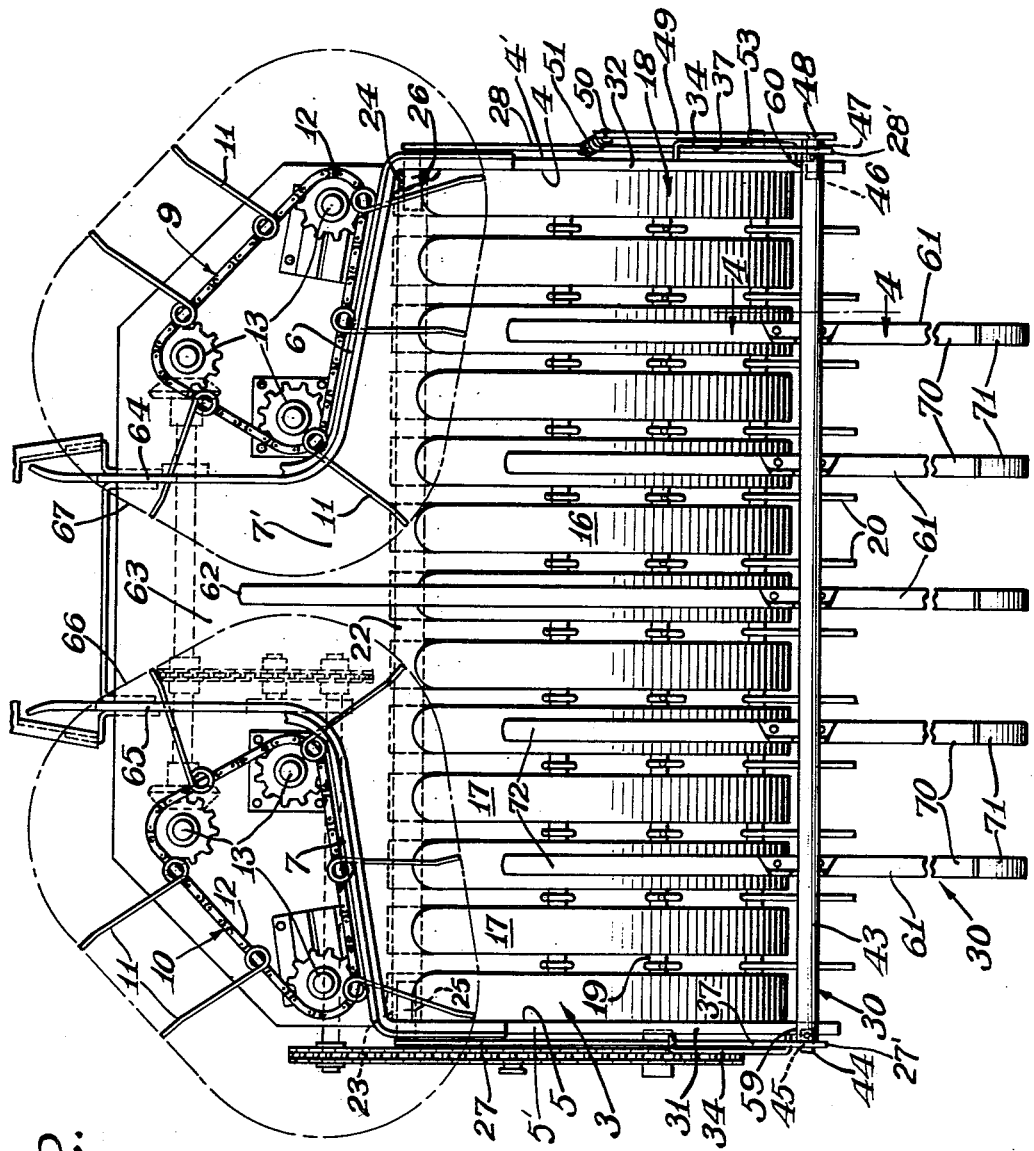

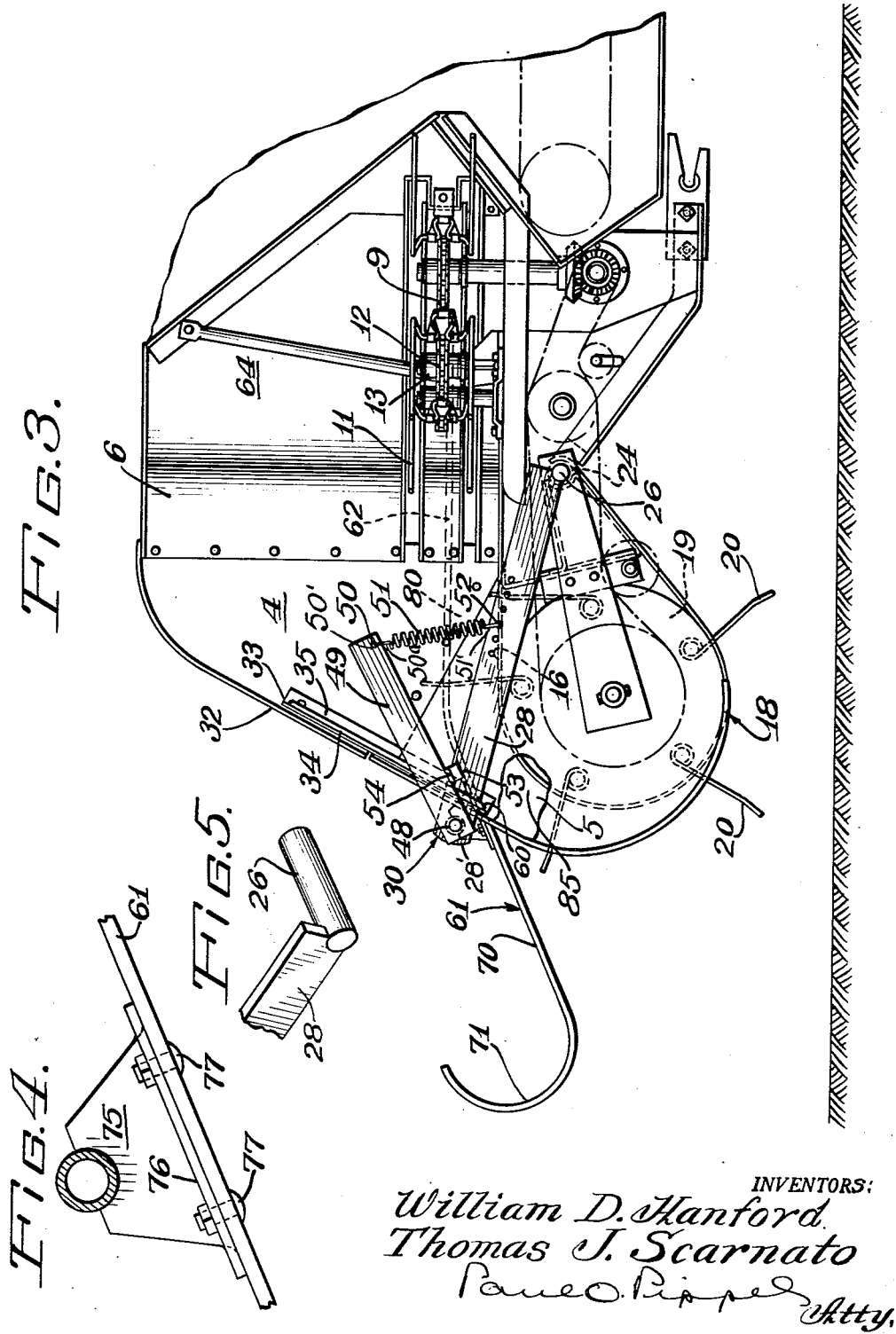

2,796,722

HARVESTER PICK-UP PACKER DEVICE

William D. Hanford, Downers Grove, and Thomas J. Scarnato, Chicago, Ill., assignors to International Harvester Company, a corporation of New Jersey Application October 28, 1953, Serial No. 388,713

10 Claims. (Cl. 56—364)

This invention relates to harvesters of the type incorporating a pick-up for picking cut crops from a field, the pick-up delivering to a processing mechanism and more specifically the invention concerns a device for holding the crops against the pick-up for effective action thereby to counteract high winds which may tend to blow the material about or to meet conditions where the crops are extremely dry and fluffy to improve their delivery to the processing mechanism.

A general object of the invention is to devise a novel packing device in combination with a gatherer of novel design wherein the packer device comprises a series of fore and aft extending slats superposed with respect to the picker device and extending forwardly therefrom to provide an obstruction to the material being tossed high up on top of the picker.

A more specific object of the invention is to devise such a packer wherein the packer bars are pivoted intermediate their ends on an axis disposed forwardly of the picker drum in order to accommodate the normal load of crops moving between the same and the picker drum, the mounting of said bars being such that the entire packer bar assembly is movable bodily upwardly and rearwardly by an overload of material with the packer bar assembly moving in such manner as to assist rearward movement of the increment of crops immediately ahead of the overload.

Another object of the invention is to provide a spring loaded packer assembly which is yieldably biased toward the picker drum in order to accommodate varying volumes of crops passing between the same and the drum.

These and other objects of the invention will become more apparent from the specification and the drawings wherein:

Figure 1 is a forward perspective view of a harvester incorporating the invention;

Figure 2 is an enlarged fragmentary plan view of the harvester shown in Figure 1 with the packer assembly applied thereto;

Figure 3 is a side elevational view of the structure shown in Figure 2;

Figure 4 is an enlarged fragmentary transverse vertical sectional view taken substantially on the line 4—4 of Figure 2; and Figure 5 is an enlarged fragmentary perspective view of the packer assembly mounting.

Describing the invention in detail, the harvester generally designated 2 comprises a forward platform structure generally designated 3 in the form of a forwardly open trough including spaced generally upright, fore and aft extending side panels 4 and 5, the rear extremities of the panels 4 and 5 being connected to inwardly extending upright rear panels 6 and 7, respectively, which between their adjacent edges define a narrow throat or inlet 7' of a processing component generally designated at 8.

Condensing means 9 and 10 are provided at opposite sides of the throat 8 and these each include a plurality of raking fingers 11, 11 which are mounted on an associated chain 12 carried in a triangular arrangement on a plurality of sprockets 13, 13 and oriented to operate in a generally horizontal plane through appropriate slots in the related panels of the trough structure, the condensing means 9 operating through slots 14 in the panels 4 and 6 and the condensing means 10 operating through slots 15, 15 in the panels 5 and 7. It will be seen that the condensing means 9 and 10 sweep the crops laterally from opposite ends of a generally horizontal deck 16 which is defined by a series of stripper bars 17, 17 constituting part of a picker drum generally indicated 18 which includes a rotatable cylinder structure 19 with a plurality of fingers 20, 20 passing between the related stripper bars 17, 17 and coming to extended relationship with respect to the drum structure on the under and forward sides of the drum structure and retracting through the deck of the top side of the picker as well shown in U. S. Patent 1,815,327. The stripper bars 17, 17 constitute part of the support structure 4 and 8 and their rear ends are connected to a transverse beam member 22 also part of the support which extends along the rear extremity of the platform 16 between the panels 4 and 5 and at opposite ends is provided with sockets 23 and 24 for pintles 25 and 26 on the rear ends of fore and aft extending arms 27 and 28 of a finger bar packer or compressor assembly or feed assisting device generally designated 30. The arms 27 and 28 extend along the outer sides 5' and 4' of the panels 5 and 4 respectively and project forwardly beyond the forward edges 31 and 32 thereof, said edges being angled diagonally upwardly, rearwardly as seen in Figure 1 and Figure 3. Each panel 4 and 5 is provided with a guide member 33 which includes an elongated rod 34 which is spaced laterally of a parallelling channel shaped mounting member 35 attached to the outer side of the related panel 4 or 5 as seen in Figures 1 and 3 along the forward edge thereof, the member 34 having inturned ends connected to the member 35 and being laterally spaced therefrom to define a vertically elongated slot 37 which receives the forward extremity of the related arm 27 or 28 therethrough for vertical guiding movement thereof and to prevent the related arm 27 or 28 from moving laterally.

The forward ends 27', 28' of the control arms 27 and 28 extend forwardly of the panels 4 and 5 and journal a pressure finger support shaft 43 on a generally horizontal axis disposed forwardly of the drum structure 16 thereabove and said shaft 43 being in the form of a pipe with a coaxial pin 44 connected to one end projecting outwardly therefrom through an opening 45 in the forward end of the arm 27 and the opposite end of the shaft 43 is provided with a pin 46 which projects through an opening 47 in the forward end of the arm 28 and the outer end of the pin is connected as at 48 to the forward end of a diagonally rearwardly upwardly extending arm 49 for pivotal rotation therewith about the axis of the shaft 43. The rear end 50 of the arm 49 is connected at 50' to the upper end 50a of a tension spring 51, the lower end 51' of which is connected as at 52 to the arm 28 intermediate its ends whereby the packer finger assembly is constantly biased to rotate in a clockwise direction as seen in Figure 3 for a purpose hereinafter explained. The arm 28 is provided with a stop member 53 in the path of rotation of the arm 49 for abutment therewith as at 54 to limit such pivotal movement as induced by the spring 51. It will be seen from a consideration of Figures 1 and 3 that the packer assembly is bodily biased downwardly about the axis of rotation of the arms 27 and 28 which is disposed behind the drum assembly by means of a tension spring 55 which has an upper end 55' connected at 56 to the arm 27 intermediate its ends and the lower end 55" of the spring 55 being connected as at 58 to a portion of the panel 5 at a point below the arm 27. Downward movement of the assembly is limited through abutment of the arms 27 and 28 with the lower inturned ends 59 and 60 of the related guide bars 34.

The bar or shaft 43 is provided with a plurality of fore and aft extending packer fingers or bars 61, 61 which are spaced axially of the bar 43 and positioned in generally parallel relationship to each other as seen in Figure 2 and the center bar 61 is substantially longer than the side bars and has a rear end portion 62 which extends beyond the rear edge of the deck of the picker over the platform 63 of the throat structure of the processing mechanism substantially centrally between the side walls 65 and 64 of the throat structure intermediate the peripheral paths 66 and 67 (Figure 2) of the gathering condensing mechanisms 9 and 10. It will be seen that the other fingers 61, 61 terminate at their rear extremities ahead of the peripheral paths of condensing means 9 and 10 as best seen in Figure 2.

It has been found to be of great importance that the packer bars 61 be strategically located with respect to the lateral extremities of the deck of the picker and that the end fingers be disposed inwardly of the opposite ends of the back approximately on the order of one quarter of the length of the deck and that the spacing of the fingers between these end fingers be substantially uniform. It will be seen that the fingers 61 have forward end portions 70 which project a substantially forward distance of the picker drum and that these forward portions slope downwardly forwardly as best seen in Figure 3 and the forward extremities of the fingers are disposed slightly above the level of the center of the picker drum and are provided with upturned end portions 71 to prevent hair pinning of the crops thereagainst. It will also be seen from a consideration of Figure 3 that the rear end portions 72 of the fingers at opposite sides of the center fingers are coplanar with the rear end portions 62 of the center finger and overlay the deck, and in the contacting position of the arm 49 with the stop 54 extends generally parallel to the plane of the deck which is disposed substantially horizontally. Each finger is connected at its intermediate end to a support bar 43 by means of the bracket 75 weld-connected to a shaft 43 and depending therefrom and having a lateral flange portion 76 at its outer edge through which pass bolts 77, 77 which also pass through the associated finger when connected therewith.

*Operation of the device*

In operation the harvester unit is moved forwardly into the crop, the pick-up drum rotates in a direction lifting the crops upwardly onto the deck of the picker in the space 80 between the fingers and the deck where the crops are normally compressed therebetween while they are being advanced rearwardly by the fingers 20 as well as the condensing fingers 11. It will be seen that if the crops should wad up or bunch up on the deck, that is back of the axis of pivot of the shaft 43, the finger assembly will pivot in a manner bringing its forward end downwardly whereby the rear extremities of the fingers are raised upwardly to enlarge the space 80 to accommodate the increased volume of the crops. Simultaneously the inlet end 85 of the space 80 is constricted due to the advancement of the forward extremities 70 of the fingers toward the forward edge of the deck 16. This has a tendency within limits to compress the oncoming increment of crops. This last described pivotal action of the fingers is accommodated against the resistance of the spring 51. However, if a large volume of crops is forcing into the inlet end 85 of the space 80 while crops are still under the packer fingers on the deck, the entire assembly will pivot about the axis of the support arms 27 and 28 so that the entire assembly will rise and inasmuch as the axis of pivot of the shaft 43 is maintained above the axis of pivot of the arms 27 and 28 the entire assembly will have a rearward component of movement in addition to the upward component so that the fingers at their rear ends will assist and move the crops under the rear extremities of the fingers rearwardly. And furthermore, the relative disposition of these axes of pivot will also upon downward movement of the entire assembly about the axis of pivot of the arms 27 and 28 on pintles 25 and 26 cause the fingers to move forwardly and thereby tend to shift some of this excess load volume of crops forwardly to assist redistribution.

It will be appreciated that the novel construction herein shown is subject to modification and is merely illustratory and that the invention is only limited by the appended claims.

What is claimed is:

1. In a harvesting machine having a support structure embodying an overshot pick-up device; a feed-assisting mechanism carried by said structure and comprising a pair of fore and aft extending arms at opposite ends of said pick-up device, said arms having rear end portions extended rearwardly of the device, means pivotally coaxially mounting said rear end portions of said arms on said support structure on a fixed generally horizontal axis rearwardly of said device, said arms having forward end portions projected ahead of said device, a transverse generally horizontal shaft extending between said forward end portions of said arms and journalled therefrom, a packer assembly extending lengthwise fore and aft and fixed intermediate its ends to said shaft and having a rear portion overlying said pick-up device in vertically spaced relationship thereto, and having a forward portion projecting a substantial distance ahead of said pick-up device, a rearwardly diagonally upwardly extending element fixed at one extremity to said shaft and having its opposite extremity disposed above an adjacent arm, a spring stressed in tension between said opposite extremity of said element and the adjacent arm for biasing said packer assembly, pursuant to rotation of said shaft to rotate in a direction advancing its rear portion toward said pick-up device, cooperative stop means on said element and said adjacent arm for limiting said rotation, spring means connected to and extending between an arm and said support for urging said arms with the forward portions downwardly, and means on said support cooperatively associated with said arms for limiting downward movement thereof to a position disposing said shaft at a level above said axis of pivot of the rear end portions of said arms to obtain an upward and rearward movement component of said packer assembly upon the entry of an overload between the same and said device whereby said assembly is caused to assist in moving a preceding crop increment rearwardly ahead of an oncoming overload crop increment.

2. The invention according to claim 1 and further characterized in that said pick-up device has a generally horizontal deck and said rear portion of the packer assembly extends in normal position generally parallel to said deck and said forward portion of said packer assembly extends diagonally downwardly from said rear portion and projects a substantial distance ahead of said pick-up device.

3. The combination according to claim 1 and said harvester having a narrow throat housing extending rearwardly from said pick-up in receiving relationship thereto and a part of said rear portion of said packer assembly extends a substantial distance rearwardly into said throat.

4. The combination according to claim 1 and said harvester comprises a housing with laterally spaced side walls at opposite ends of said pick-up projecting upwardly therefrom, rear walls extending inwardly from said side walls along the rear of said pick-up device and spaced at adjacent ends and defining an outlet therebetween, condensing means at opposite ends of said pick-up device carried by said structure and having fingers sweeping through slots in the adjacent side and rear walls into said outlet opening and said packer assembly having a part of its rear portion extending through said outlet between said condensing means and having other parts in fore and aft alignment with respective condensing means and terminating thereahead.

5. In a harvesting machine having a support structure incorporating an overshot pick-up device, a feed-assisting mechanism comprising fore and aft extending arm means, means pivotally mounting said arm means at a fixed point to said structure on a generally horizontal axis for vertical swinging movement with respect to said pick-up device, means directly connected to said arm means at another point and providing a generally horizontal axis of pivot, and packer means mounted on said last-mentioned means and having a portion overlying said pick-up device and pivotal with respect to said arm means on said last-mentioned axis for movement toward and away from said device and bodily swingable with said arm means toward and away from said device about the axis of pivot of said arm means.

6. The combination according to claim 5 and said packer means having another portion projecting forwardly of said pick-up device and sloping downwardly forwardly from said second mentioned axis to a level below the top of said device.

7. The combination according to claim 5 and said arm means sloping upwardly forwardly of said axis of pivot thereof to said support and said axis of pivot of said first mentioned means being at a level above said axis of pivot of said arm means to the support.

8. The combination according to claim 7 and said arm means comprising a pair of arms disposed at opposite sides of said device, and said structure comprising fore and aft extending side panels upstanding from opposite sides of said device, and guide means for respective arms carried by said panels and having vertically elongated fore and aft open slots receiving the respective arms therethrough.

9. In a harvester having crop-gathering means at its forward end, support means therefor including a pair of laterally spaced upright elements respectively at opposite sides of said crop-gathering means; a crop compressor comprising a member disposed transversely with respect to the elements and having opposite end portions projecting respectively outwardly thereof, means including fore and aft extending arms mounting said member on the supporting means for vertical rocking movement therewith about a generally horizontal fixed axis disposed rearwardly of said member, means pivotally mounting said member on said arms for pivotal movement relative to said arms, and compressor means connected to said member and extending rearwardly therefrom over said crop gathering means.

10. The invention defined according to claim 9 and a transverse rearwardly extending arm connected to said member for rotary movement therewith, stop means on an adjacent of said arms positioned in the path of rotation of said arm to limit downward movement of said arm, and a tension spring having an upper end connected to said arm and a lower end connected to said adjacent of said arms at a point below said arm.

References Cited in the file of this patent

UNITED STATES PATENTS

| | | |
|---|---|---|
| 1,319,724 | Pelton | Oct. 28, 1919 |
| 2,430,734 | Raney et al. | Nov. 11, 1947 |
| 2,458,713 | Linderer | Jan. 11, 1949 |
| 2,713,762 | Clausen | July 26, 1955 |